United States Patent
Endo et al.

(10) Patent No.: US 6,810,152 B2
(45) Date of Patent: Oct. 26, 2004

(54) IMAGE PROCESSING APPARATUS, METHOD OF PROCESSING IMAGES, AND STORAGE MEDIUM

(75) Inventors: Takaaki Endo, Kanagawa (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 09/812,676

(22) Filed: Mar. 21, 2001

(65) Prior Publication Data

US 2002/0090143 A1 Jul. 11, 2002

(30) Foreign Application Priority Data

Jan. 11, 2001 (JP) .......................................... 2001-004085

(51) Int. Cl.⁷ .............................. G06K 9/36; H04N 7/00; G01C 22/00
(52) U.S. Cl. ........................ 382/284; 382/103; 382/191; 348/36; 701/25
(58) Field of Search ................................ 382/103, 104, 382/106, 206, 282, 284, 285, 291, 294, 305; 345/418, 653, 654; 348/36, 39, 149, 169; 701/25

(56) References Cited

U.S. PATENT DOCUMENTS 6,222,447 B1 * 4/2001 Schofield et al. ........... 340/461
6,335,754 B1   1/2002 Endo et al.
6,337,683 B1 * 1/2002 Gilbert et al. ............... 345/418
6,389,179 B1 * 5/2002 Katayama et al. .......... 382/284
6,498,620 B2 * 12/2002 Schofield et al. ........... 348/148

FOREIGN PATENT DOCUMENTS

| JP | 09-062861 | 3/1997 |
| JP | 11-168754 | 6/1999 |
| JP | 2000-348165 | 12/2000 |

OTHER PUBLICATIONS

M. Hirose, et al., "Generation of Wide–Range Virtual Spaces Using Photographic Images," Virtual Reality Annual International Symposium, Mar. 14–18, 1998, Atlanta, Georgia, IEEE 1998 pp. 234–241.

* cited by examiner

Primary Examiner—Kanji Patel
(74) Attorney, Agent, or Firm—Fitzpatrick, Cella, Harper & Scinto (57) ABSTRACT

Video cameras capture surrounding images, and time code generated by a time code generator is attached to the images. Likewise, when the respective images are captured, the position and inclination of the car are measured by a GPS, a three-axis angle sensor, and a geomagnetic angle sensor, and attached to the respective images. A panoramic image can be produced by connecting together images having the same time code. Performing the aforementioned signal processing for a plurality of routes provides a series of panoramic images. When presenting a panoramic image to a viewer, a panoramic image that is captured at a point closest to a viewpoint of the viewer is identified so that images can be presented to the viewer according to a view direction of the viewer.

9 Claims, 9 Drawing Sheets

IMAGE PROCESSING APPARATUS, METHOD OF PROCESSING IMAGES, AND STORAGE MEDIUM

FIELD OF THE INVENTION

The present invention relates to an image processing apparatus and a method for capturing wide-angle images and presenting them to a viewer, and a storage medium for such images.

BACKGROUND OF THE INVENTION

A technology is known where a series of panoramic images along a route are captured and stored in a memory, and the stored panoramic images are presented to a viewer. A panoramic image is a series of pictures stitched together sequentially, the pictures being landscapes surrounding a viewer through 360 degrees span and being captured with a camera. A panoramic image offers the images of landscapes in a view direction of a viewer when the viewer stands at a position on a route and looks at the landscape from there.

However, in the conventional art, only one series of panoramic images was available for viewing. Therefore, when a viewer observes the sequence of panoramic images, the viewpoint of the viewer is confined on the route in which the sequence of images were captured. Thus, the images of landscapes available to the viewers are limited to particular directions in which the panoramic images were captured, not allowing the viewer to move his viewpoint freely.

The sequence of images may be interpolated so as to allow the viewer to move his viewpoint to some extent. However, this requires a large amount of data to be processed, imposing a heavy load on a computer and consuming a lot of time for processing the data.

Use of a three-dimensional geometric model of an environment allows the viewer to move his viewpoint freely. However, such a model results in deteriorated images as compared to the presenting of images to the viewer by switching the images of a series of panoramic images.

The present invention was made in view of the aforementioned problems. An object of the invention is to allow capturing of wide-angle images, thereby offering more freedom to the viewer in moving his viewpoint when the viewer observes the images.

SUMMARY OF THE INVENTION

In order to achieve the aforementioned objects, the image processing apparatus according to the present invention is constructed as follows.

An image processing apparatus according to the invention comprises:

storage means for capturing wide-angle images at positions on multidimensional grids by using a plurality of imaging means each of which captures a predetermined sight, the storage means storing the positions at which the images are captured and a reference direction with respect to which the images are captured, the positions and reference direction being stored corresponding to the images;

control means for specifying a viewpoint and a view direction of a viewer; and presenting means for identifying an image that is captured at a point closest to a viewpoint of a viewer from among the images stored in the storage means, and identifying an image region according to a view direction of the viewer by using the reference direction, and presenting to the viewer an image that falls in the image region.

The image processing apparatus further comprises sync signal generating means that provides a sync signal to the plurality of imaging means, wherein the plurality of imaging means capture the images in synchronism with the sync signal.

The image processing apparatus further comprises index generating means that generates and attaches an index to images captured by each of the plurality of imaging means, the images having a common index being stitched together to form a wide-angle image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

This embodiment is directed to an image processing apparatus that allows the viewpoint of a viewer to move in two-dimensional directions and presents panoramic images according to the view direction of the viewer.

Figure 1:
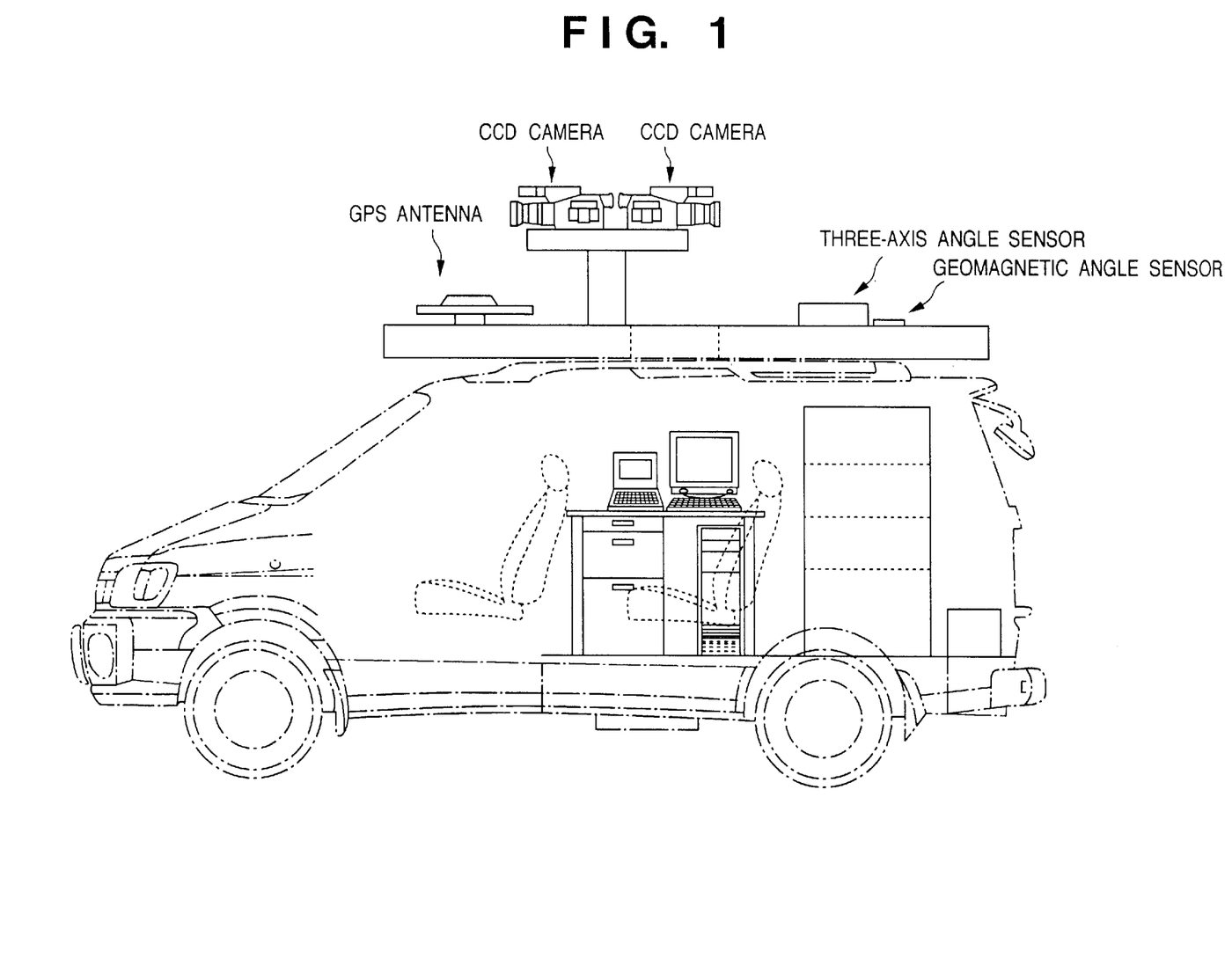
FIG. 1 illustrates the production of panoramic images.

The production of the panoramic pictures will be described. Referring to FIG. 1, a moving base such as a car is equipped with a plurality of image-capturing devices, for example, CCD (charge coupled device) cameras. The plurality of CCD cameras are used to capture landscapes surrounding the car through 360 degrees.

The car is equipped with a GPS (global positioning system) antenna for a GPS receiver (not shown) that determines an absolute position of the camera, a three-axis angle sensor that measures an inclination of the car with respect to horizontal direction when the cameras are capturing landscapes, and corrects values measured with a later described geomagnetic angle sensor, and the geomagnetic angle sensor that detects a direction (reference direction) in which the car is oriented when the camera captures the landscape.

Figure 2:
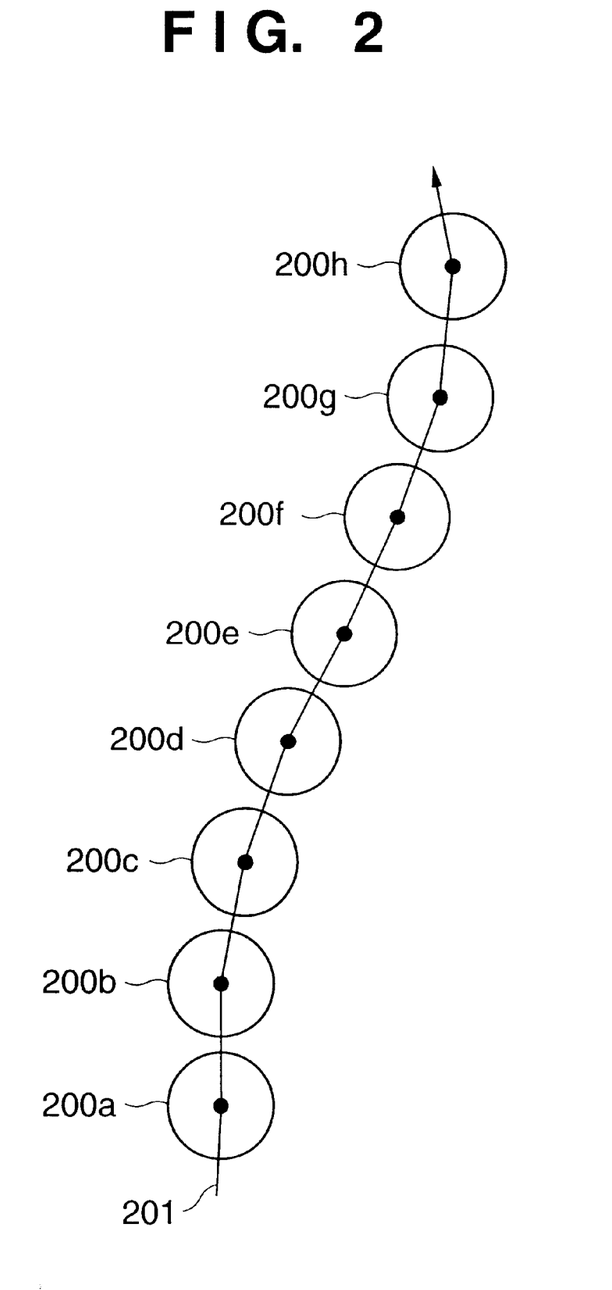
FIG. 2 illustrates panoramic images and a route along which the respective panoramic images are captured.

The car equipped with the aforementioned devices runs along, for example, a route 201 shown in FIG. 2 while the CCD cameras capture landscapes at respective positions on the route 201 (each point on the route 201 of FIG. 2). The images captured at the same time are stitched together to produce a panoramic picture, thereby yielding a series of panoramic images 200a–200h as shown in FIG. 2. The route shown in FIG. 2 is only exemplary. The respective panoramic images are captured in the aforementioned manner.

Figure 3:
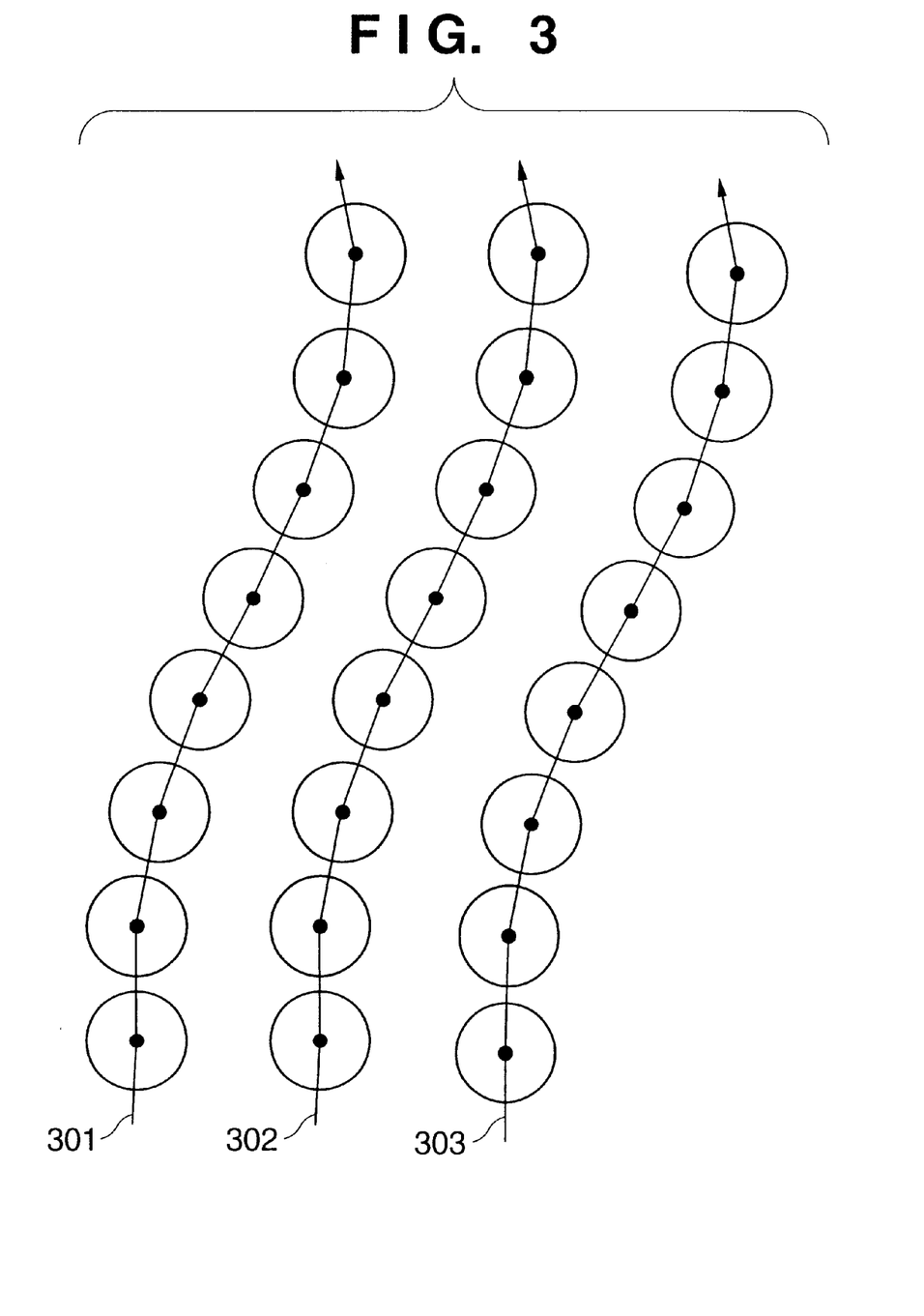
FIG. 3 illustrates panoramic images captured along respective routes when panoramic images are captured on a plurality of routes.

Likewise, a plurality of routes as shown in FIG. 3 can be provided to produce corresponding series of panoramic images (more generally by capturing panoramic images on two-dimensional grids).

Figure 6:
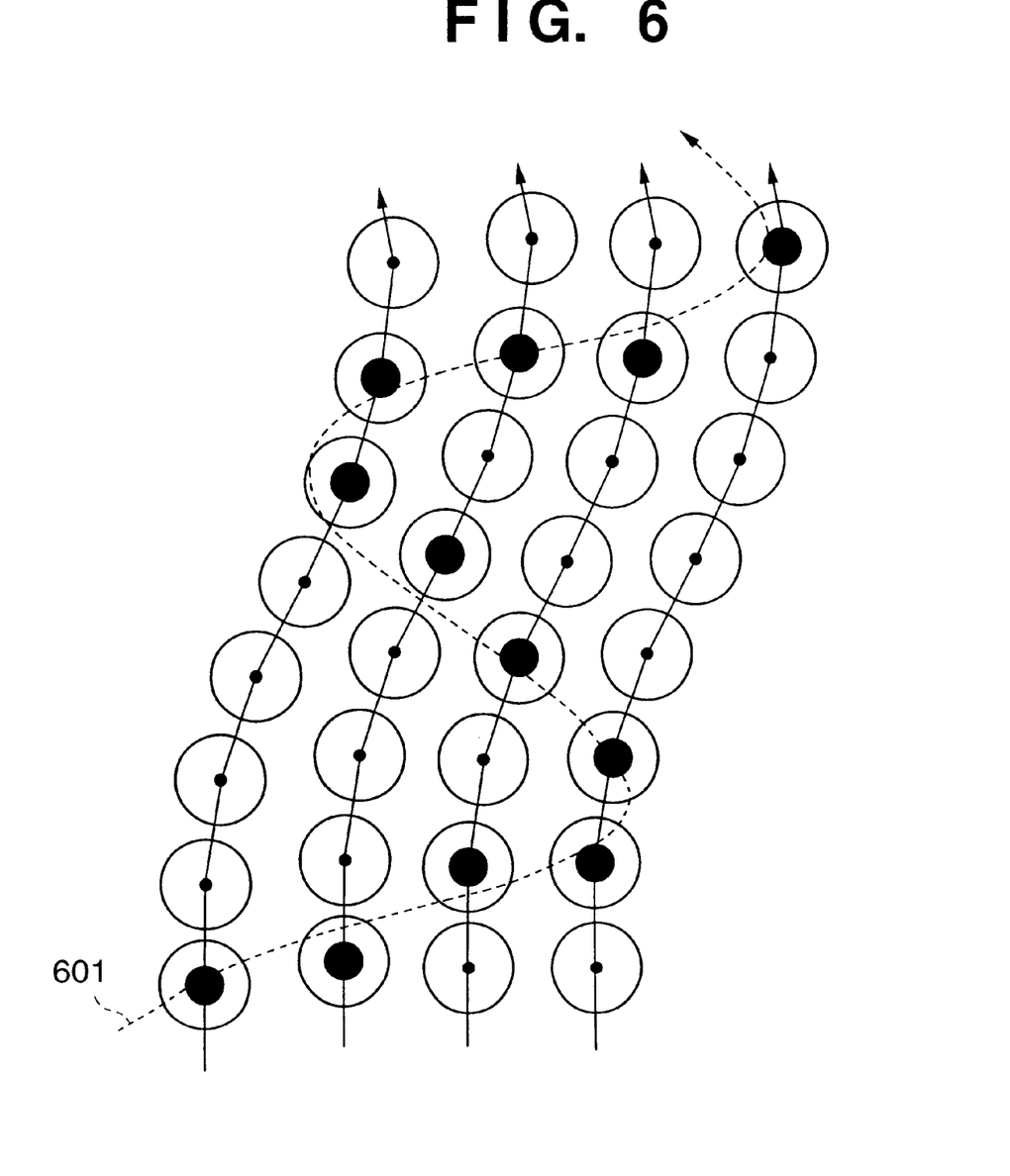
FIG. 6 illustrates the movement of a viewer's viewpoint and images presented to the viewer correspondingly.

As a result, the viewer can move his viewpoint more freely to view the panoramic images of FIG. 6 than when he views the panoramic images of FIG. 2, being allowed to observe panoramic images over a wider range of sight. In FIG. 6, reference numeral 601 denotes a track along which the viewpoint of the viewer moves. As the viewer's viewpoint moves along the track, the viewer observes panoramic images captured at positions shown by larger dots than other positions. As the viewer's viewpoint moves, the panoramic images are switched such that the viewer observes a panoramic image captured at a point closest to the viewer's viewpoint. The specific manner in which the panoramic images are presented to the viewer according to the viewpoint of the viewer will be described later.

Figure 4:
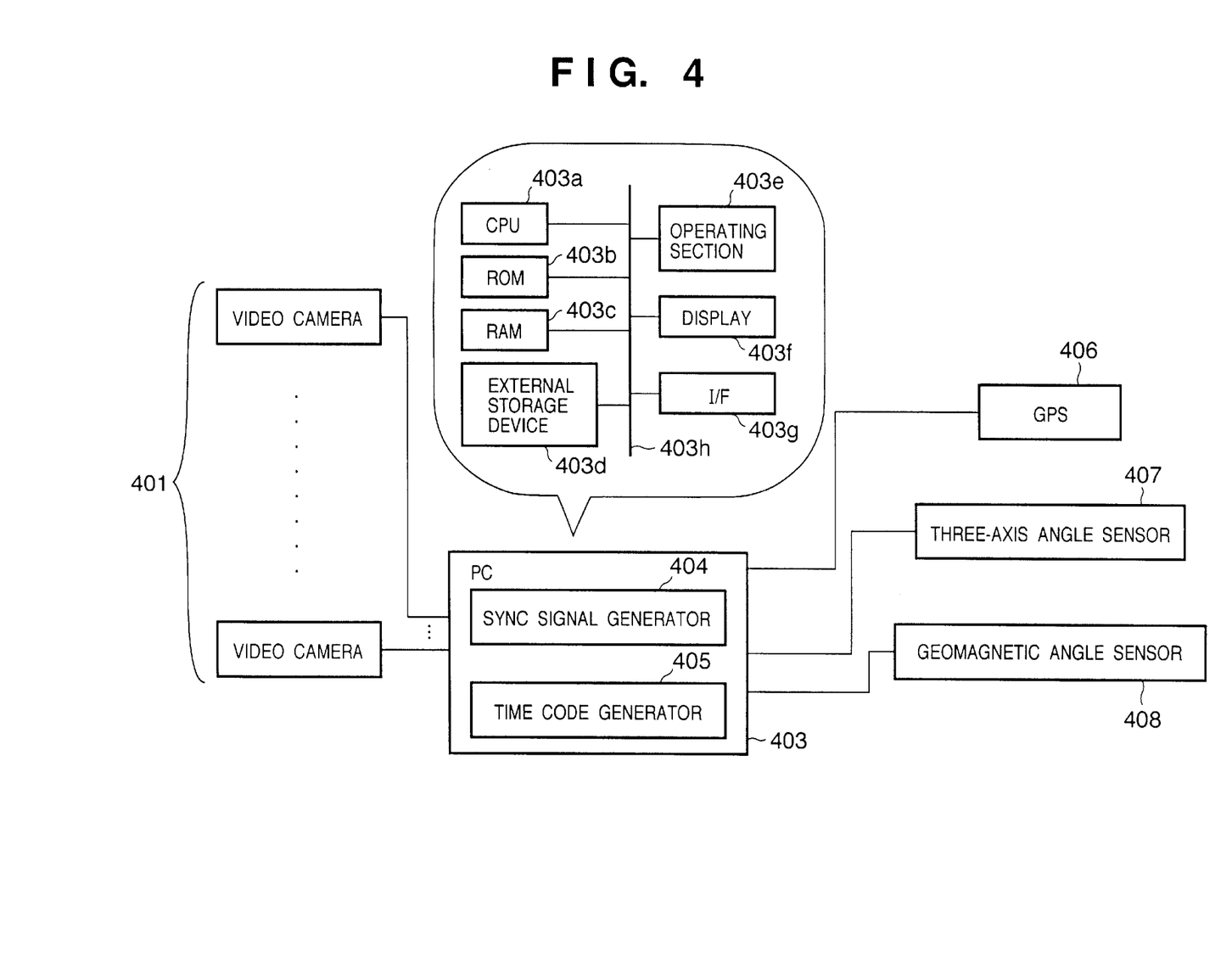
FIG. 4 illustrates a basic configuration of an apparatus that produces a series of panoramic images.

FIG. 4 illustrates a basic configuration of an apparatus that produces a series of panoramic images. The respective devices shown in FIG. 1 are carried on a moving body such as a car.

Reference numeral 401 denotes video cameras that correspond to CCD cameras (video camera) of FIG. 1. Reference numeral 403 denotes a general computer (referred to as PC hereinafter) that receives images captured by the video cameras 401 to produce the panoramic images. The production of a panoramic image will be described later in detail.

The PC 403 includes a sync signal generator 404 and a time code generator 405. The sync signal generator 404 provides a sync signal to each of the video cameras 401. The time code generator 405 produces an index that is attached to the images produced by the respective video cameras 401. The time code is used as the index in the first embodiment. The time code generator 405 times at all times so that the video images are assigned time code as the index. The images captured at the same time have a common time code and therefore referring to the time code allows identifying of images that should be connected when a panoramic image is produced.

In the first embodiment, the aforementioned sync signal generator 404 and the time code generator 405 reside in the PC 403. However, the configuration is not limited to this, and the generators 404 and 405 may be independent of the PC 403 and may be connected to the PC 403.

The PC 403 incorporates sections 403a–403h.

Reference numeral 403a denotes a CPU that reads programs and data from a ROM 403b and RAM 403c, executes various procedures, and performs an overall control of the PC 403.

Reference numeral 403b denotes a ROM that stores a boot program for the PC 403 and various settings for controlling the PC 403. The ROM 403b also stores character codes.

Reference numeral 403c is the RAM that includes an area in which, for example, programs and data are temporarily loaded from an external storage device 403d. The RAM serves as a work area when the CPU 403a performs signal processing.

Reference numeral 403d denotes the external storage device that holds programs and data that are installed from storage media such as a CD-ROM and a floppy disk. The external storage device 403d can store a file that serves as an auxiliary work area when the CPU 403a needs a work area larger than the work area of the RAM 403c.

Reference numeral 403e denotes an operating section that includes a pointing device such as a key board and a mouse and is used to input various commands into the PC 403.

Reference numeral 403f denotes a display in the form of a CRT or an LCD, and displays messages from the PC 403 and results of various signal processes.

Reference numeral 403g denotes an interface (I/F) that includes a serial interface and/or a network interface, so that the apparatus can be connected through a serial cable and/or a network cable to peripheral equipment and/or a network.

Reference numeral 403h denotes a bus that connects the aforementioned sections.

Reference numeral 406 denotes a GPS. As described with reference to FIG. 1, the GPS measures an absolute position of a point at which a landscape is captured. The method of measuring the position based on the GPS is well known and the description thereof is omitted.

Reference numeral 407 denotes a three-axis angle sensor. As described with reference to FIG. 1, the three-axis angle sensor measures an inclination of the car with respect to horizontal direction when the cameras are capturing landscapes, and corrects values measured by the later described geomagnetic angle sensor. The method of correction is not in the scope of the present invention and the description thereof is omitted.

Reference numeral 408 denotes a geomagnetic angle sensor. As described with reference to FIG. 1, when the cameras capture landscapes, the geomagnetic angle sensor measures a direction in which the car is oriented.

The signal processing for producing panoramic images performed by the image processing apparatus of the aforementioned configuration will be described.

As a preparatory work of the capturing of a landscape, the car is positioned at a point on a route along which a series of panoramic images are to be captured. Then, the landscapes surrounding the point are taken by the use of the video cameras 401. The video cameras 401 capture corresponding landscapes in synchronism with a sync signal received from the sync signal generator 404 in the PC 403.

The images captured by the respective video cameras 401 are input into the PC 403, which in turn attaches a time code generated by the time code generator 405 to the images. When the images are being captured, the GPS 406, three-axis angle sensor 407, and geomagnetic angle sensor 408 measure the position and orientation of the car, which are also attached to the images.

Figure 5:
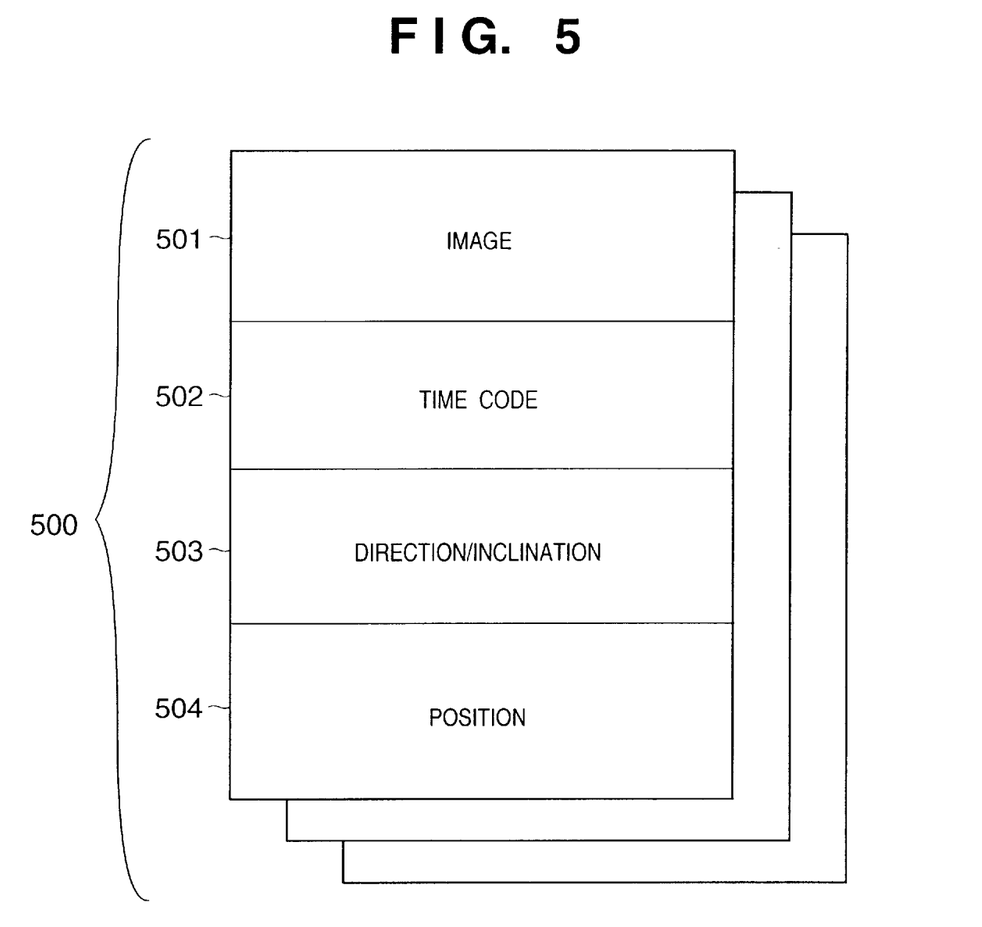
FIG. 5 illustrates an example of a file that contains images captured.

FIG. 5 illustrates an example of a configuration of a file in which the aforementioned information is attached to the respective images. Reference numeral 500 denotes a file that contains the image 501, time code 502, direction/inclination 503, and position 504. The time code 502 is the information that is outputted from the time code generator 405 when the image 501 was captured and then input into the PC 403. Using the information, images having the same time code can be connected together to produce a panoramic image. When the images captured by the respective cameras 401 are input sequentially into the PC 403, the PC 403 is required to control the order in which the images are input into the PC 403 such that a panoramic image can be produced by connecting the input images in the order in which they are input.

The direction/inclination 503 is information on the orientation of the car measured by the geomagnetic angle sensor 408 and inclination of the car relative to the ground measured by the three-axis angle sensor 407, both being measured when the image 501 is taken.

The position 504 is a position of the car measured by the GPS 406 when the image 501 is captured, i.e., a position of a panoramic image on a route produced based on the image 501. By referring to the position information 504, a point on the route closest to the viewpoint of the viewer can be identified, and a panoramic image corresponding to the identified point can be identified.

The aforementioned operations are performed at each point (e.g., 200a to 200h of FIG. 2) to capture images surrounding the point. Likewise, the aforementioned operations may be performed at each point on a plurality of routes (e.g., respective positions on the routes 301 to 303 of FIG. 3) to capture images surrounding the point.

After the above-described capturings, panoramic images are produced from images in the files of FIG. 5 that contain the images captured by the video cameras 401. Specifically, images in the files having the same time code are stitched together in the order in which they were input into the PC 403. When the thus produced panoramic images are stored in a storage device such as the external storage device 403d, the panoramic images may be subjected to image compression such as JPEG.

Figure 7:
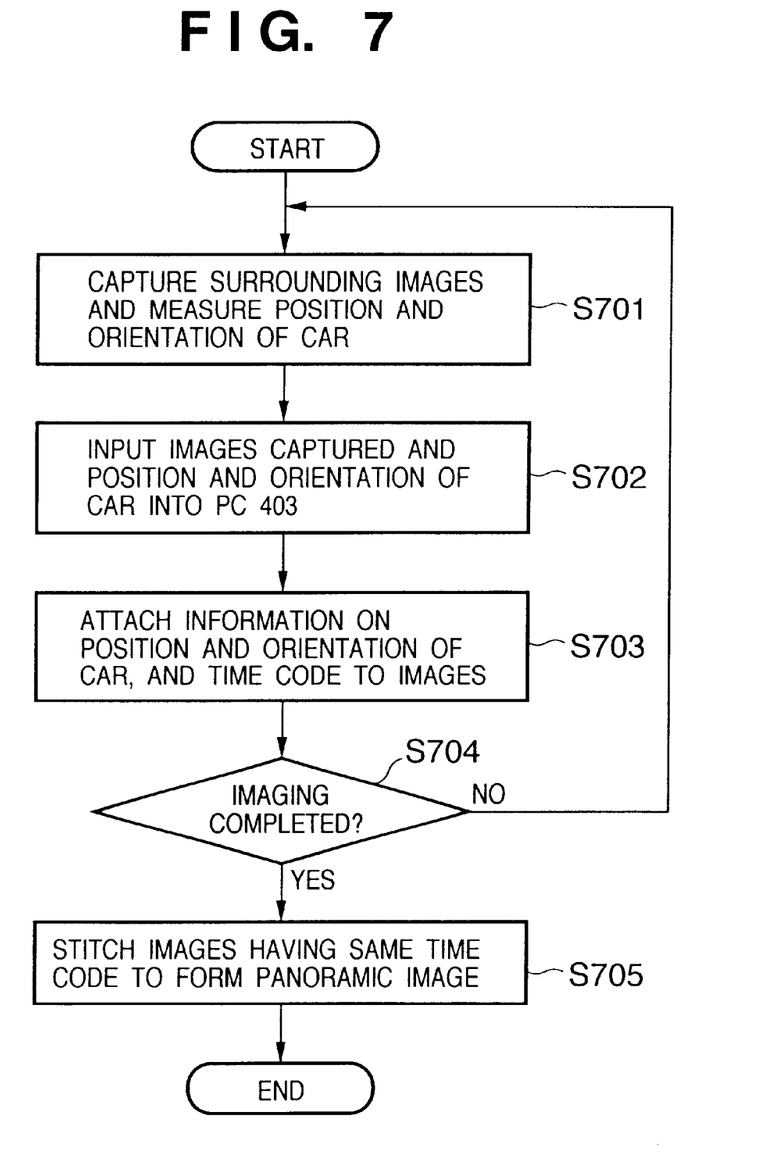
FIG. 7 is a flowchart illustrating the procedure for producing panoramic images.

FIG. 7 is a flowchart that illustrates the above-described signal processing. At step S701, images surrounding a point on a route are captured and the position and orientation of the car at that time are measured. Then, at step S702, the PC 403 receives information such as the images captured, position of the car, and orientation of the car. At step S703, the position of the car and orientation of the car are attached to images captured. The steps S701–S703 are performed for each of the positions on the route. After having captured images at all positions at step S704, the images having the same time code are stitched together to produce a panoramic image (step S705).

Using the series of panoramic images in a plurality of routes produced through the aforementioned processing, as described with reference to FIG. 6, the panoramic image captured at a point that is closest to a viewpoint of the viewer may be identified, thereby presenting panoramic images to the viewer according to the viewpoint of the viewer. The viewpoints of the viewer may be inputted to the PC 403 by using, for example, a joystick as the operating section 403e. The joystick is also used to input the view direction of the viewer into the PC 403.

Then, the method of identifying panoramic images presented to the viewer in accordance with the view direction of the viewer (i.e., the method of identifying a region of panoramic image according to the view direction of the viewer) will now be described. The image presented to the viewer according to the view direction of the viewer has $\underline{h}$ dots in a vertical dimension of the image and $\underline{d}$ dots in a horizontal dimension of the image.

Figure 8:
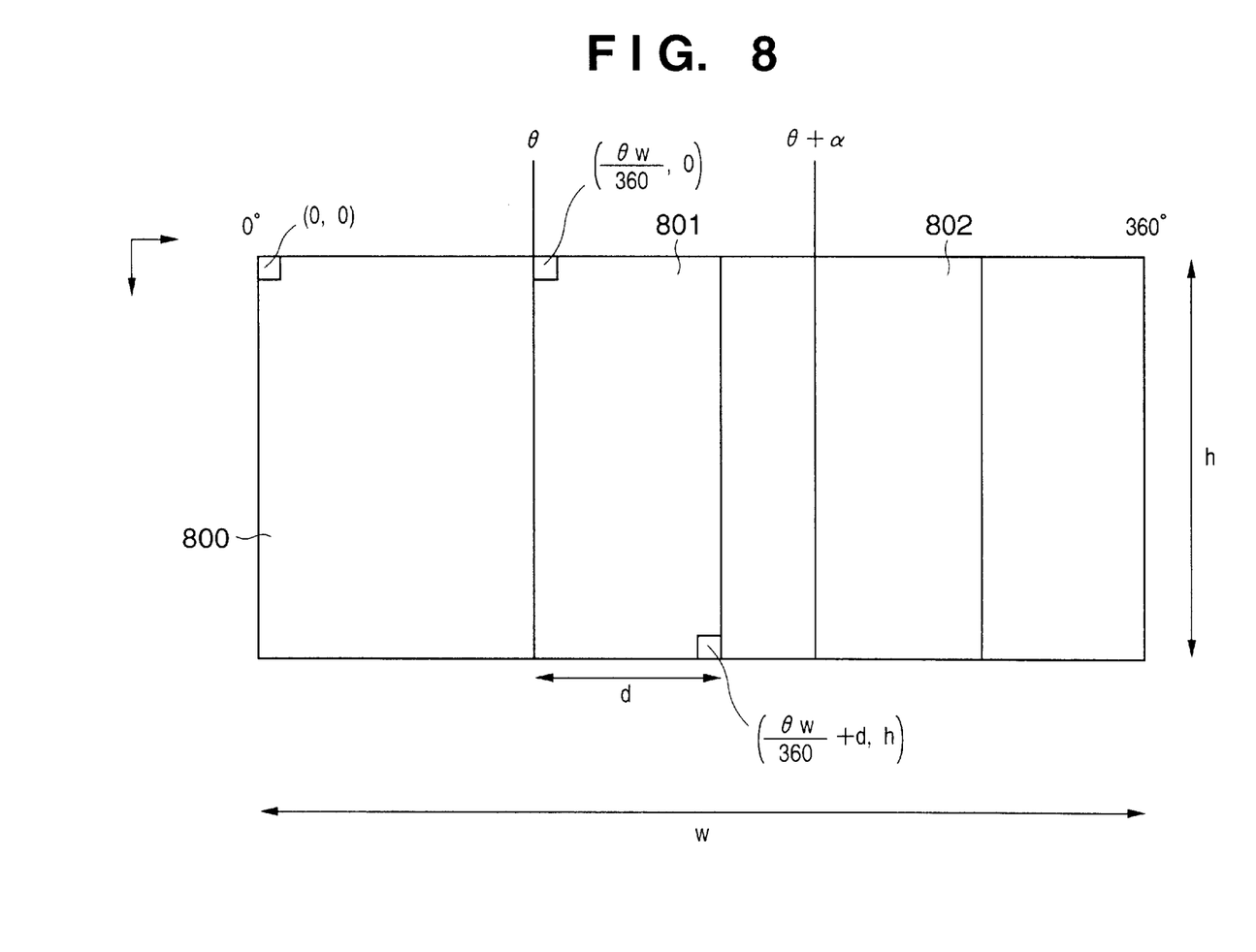
FIG. 8 illustrates a panoramic image.

FIG. 8 illustrates a panoramic image 800 having a horizontal dimension of $\underline{w}$ dots and a vertical dimension of $\underline{h}$ dots, with an origin (0, 0) of the coordinate at an upper left corner of the image. As described previously, the panoramic image 800 is an image expressed by $\underline{w}$ dots in the horizontal direction that covers a sight of 360 degrees span. Assuming that the car runs in a direction shown by θ, an image 801 as seen in the front direction can be produced by reading an image portion of a rectangular area of the panoramic image 800, the rectangular image portion having an upper left corner thereof at a coordinate ((θ/360)×w, 0) and a lower right corner thereof at a coordinate ((θ/360)×w+d, h). Thus, if the view direction of the viewer deviates by a from the front direction (i.e., θ+α), the image 802 presented to the viewer can be produced by reading another rectangular image portion of the panoramic image 800, the image portion having an upper left corner thereof at a coordinate ((θ+α/360)×w, 0) and a lower right corner thereof at a coordinate (((θ+α)/360)×w+d, h).

The direction of angle θ in which the car runs is measured by the geomagnetic angle sensor 408. Thus, an image according to the view direction of the viewer can be determined from the panoramic image having a width $\underline{w}$. The image presented to the viewer is displayed on the display 403f.

Figure 9:
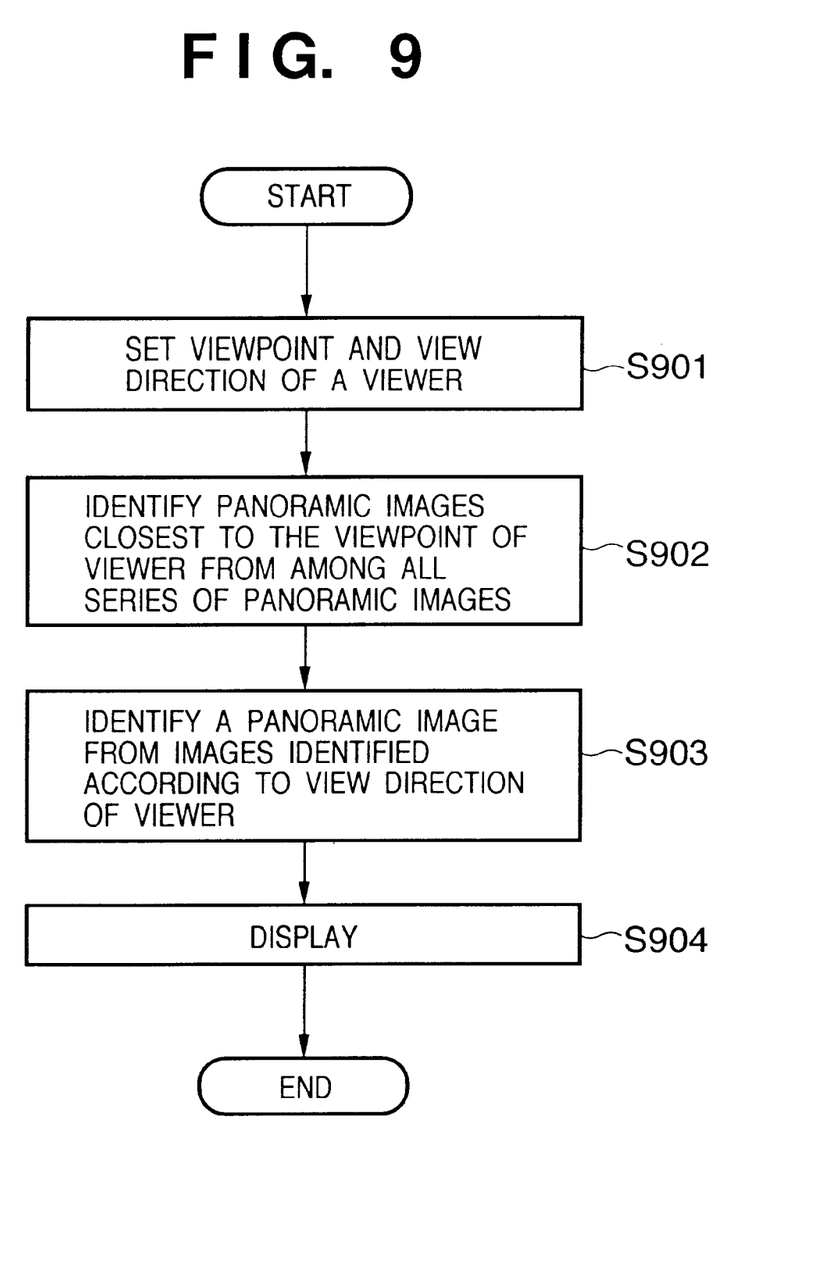
FIG. 9 is a flowchart illustrating the procedure for presenting a panoramic image to the viewer.

FIG. 9 is a flowchart illustrating a procedure in which an image according to the viewpoint and view direction of the viewer is determined from a series of the produced panoramic images and presented to the viewer.

At step S901, the viewpoint and view direction of the viewer are set by an operating section, for example, a joystick. At step S902, a panoramic image is selected from among a plurality of panoramic images, the selected panoramic image being an image captured at a point that is the closest to the viewer's viewpoint. At step S903, an image according to the view direction set at step S901 is determined from the image selected at step S902. At step S904, the image according to the viewpoint and view direction of the viewer, determined at steps S902 and S903, is displayed on a display 403f.

The method of processing images and image processing apparatus therefor permit more freedom of the movement of the viewer's viewpoint in the two-dimensional directions than the method and image processing apparatus in which panoramic images are taken at a plurality of positions along a single route and presented to the viewer.

Because the images presented to the viewer are those actually captured, images presented to the viewer are better than those produced by using, for example, a three-dimensional virtual object.

[Second Embodiment]

In the first embodiment, a plurality of panoramic images are taken along a plurality of routes. In other words, the images are captured on two-dimensional grids. However, capturing images on three-dimensional grids permits more freedom to the movement of viewer's viewpoint.

[Third embodiment]

In the first and second embodiments, images that were captured at the respective positions in the past may be stored in the external storage device 403d so that the viewer obtains freedom in time domain. In other words, when the viewer wants to view an image of one year ago at a desired photographing location, the joystick, if used as the operating section 403e, maybe operated to set the viewpoint of the viewer in the time domain so that the viewer can view the panoramic image of one year ago at that point.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or an entire process in accordance with designations of the program codes and realizes functions of the above embodiments.

In a case where the present invention is applied to the aforesaid storage medium, the storage medium stores program codes corresponding to the flowcharts (FIG. 7 and/or FIG. 9) described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
    a storing unit adapted to store positions where images are captured at each of routes on multidimensional grids using a plurality of imaging units, each of which captures a predetermined view, and a reference direction with respect to which the images are captured, the positions and the reference direction being stored corresponding to the images;
    a generating unit adapted to generate a panoramic image using a plurality of images which have been captured by the plurality of imaging units at each of the positions on each of the routes;
    a designation unit adapted to designate a desired viewpoint of a viewer and a desired view direction of the viewer; and
    a presentation unit adapted to determine an image region according to the view direction of the viewer within a panoramic image corresponding to a point closest to the viewpoint of the viewer, by using the reference direction, and to present to the viewer an image that falls in the image region.

2. The image processing apparatus according to claim 1, further comprising a sync signal generating unit adapted to provide a sync signal to the plurality of imaging units,
    wherein the plurality of imaging units capture the images in synchronism with the sync signal.

3. The image processing apparatus according to claim 1, further comprising an index generating unit adapted to generate an index for each of the images captured by each of the plurality of imaging units,
    wherein images having a common index are stitched together to form a wide-angle image.

4. The image processing apparatus according to claim 1, wherein the multidimensional grids are two-dimensional grids.

5. The image processing apparatus according to claim 1, wherein said designation unit is a joystick.

6. The image processing apparatus according to claim 1, wherein the positions are determined by a global positioning system.

7. The image processing apparatus according to claim 1, wherein the reference direction with respect to which the images are captured is determined through the use of a geomagnetic angle sensor and a three-axis angle sensor.

8. An image processing method, comprising the steps of:
    storing positions where images are captured at each of routes on multidimensional grids using a plurality of imaging units, each of which captures a predetermined view, and a reference direction with respect to which the images are captured, the positions and the reference direction being stored corresponding to the images;
    generating a panoramic image using a plurality of images which have been captured by the plurality of imaging units at each of the positions on each of the routes;
    designating a desired viewpoint of a viewer and a desired view direction of the viewer; and
    determining an image region according to the view direction of the viewer within a panoramic image corresponding to a point closest to the viewpoint of the viewer, by using the reference direction, and presenting to the viewer an image that falls in the image region.

9. A computer readable storage medium storing a program for making a computer implement the image processing method of claim 8.

* * * * *

UNITED STATES PATENT AND TRADEMARK OFFICE
CERTIFICATE OF CORRECTION

PATENT NO. : 6,810,152 B2
DATED : October 26, 2004
INVENTOR(S) : Takaaki Endo et al.

It is certified that error appears in the above-identified patent and that said Letters Patent is hereby corrected as shown below:

Column 6,
Line 11, "by a" should read -- by α --.

Signed and Sealed this

Twenty-second Day of March, 2005

JON W. DUDAS
*Director of the United States Patent and Trademark Office*